(12) United States Patent
Almassalkhi et al.

(10) Patent No.: US 11,990,750 B2
(45) Date of Patent: May 21, 2024

(54) DECENTRALIZED FREQUENCY CONTROL WITH PACKET-BASED ENERGY MANAGEMENT

(71) Applicant: University of Vermont and State Agricultural College, Burlington, VT (US)

(72) Inventors: Mads Almassalkhi, South Burlington, VT (US); Hani Mavalizadeh, Burlington, VT (US); Luis A. Duffaut Espinosa, Williston, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 313 days.

(21) Appl. No.: 17/305,491

(22) Filed: Jul. 8, 2021

(65) Prior Publication Data

US 2023/0027805 A1   Jan. 26, 2023

(51) Int. Cl.
*H02J 3/14* (2006.01)
*H02J 3/38* (2006.01)

(52) U.S. Cl.
CPC .............. *H02J 3/144* (2020.01); *H02J 3/381* (2013.01); *H02J 2203/10* (2020.01); *H02J 2310/54* (2020.01); *H02J 2310/60* (2020.01)

(58) Field of Classification Search
CPC ........ H02J 3/144; H02J 3/381; H02J 2203/10; H02J 2310/54; H02J 2310/60; H02J 3/14;
(Continued)

(56) References Cited

U.S. PATENT DOCUMENTS

| 10,256,631 B2 | 4/2019 | Frolik et al. |
| 2017/0005564 A1* | 1/2017 | Somani ............... H02M 5/4585 |

(Continued)

FOREIGN PATENT DOCUMENTS

| EP | 1739806 A1 | 1/2007 |
| WO | 2017019136 A1 | 2/2017 |

OTHER PUBLICATIONS

Mavalizadeh et al., "Decentralized Frequency Control Using Packet-Based Energy Coordination." 2020 IEEE International Conference on Communications, Control, and Computing Technologies for Smart Grids (Nov. 2020).

(Continued)

*Primary Examiner* — Ziaul Karim
(74) *Attorney, Agent, or Firm* — Downs Rachlin Martin PLLC (57) ABSTRACT

Demand response methodologies for primary frequency response (PFR) for under or over frequency events. Aspects of the present disclosure include methods for controlling a fleet of distributed energy resources equipped for PFR and quantifying in real time an amount of primary frequency control capacity available in the fleet. In some examples, the DERs may be configured to consume and discharge electrical energy in discrete energy packets and be equipped with a frequency response local control law that causes each DER to independently and instantaneously interrupt an energy packet in response to local frequency measurements indicating a grid disturbance event has occurred.

17 Claims, 7 Drawing Sheets

(58) Field of Classification Search
CPC ..... H02J 3/28; H02J 3/32; H02J 3/241; Y02B 70/3225; Y04S 20/222
See application file for complete search history.

(56) References Cited

U.S. PATENT DOCUMENTS

| | | |
|---|---|---|
| 2018/0082385 A1 | 3/2018 | Frolik et al. |
| 2018/0329383 A1 | 11/2018 | Lian et al. |
| 2019/0214820 A1 | 7/2019 | Frolik et al. |
| 2019/0245347 A1* | 8/2019 | Matamoros ............... H02J 3/00 |
| 2019/0324415 A1 | 10/2019 | Frolik et al. |
| 2021/0006063 A1* | 1/2021 | Mackey ............... H02H 1/0007 |
| 2021/0097560 A1* | 4/2021 | Hammerstrom ........ G06Q 50/06 |
| 2021/0242686 A1* | 8/2021 | Petersen ................. H02J 3/381 |

OTHER PUBLICATIONS

Schweppe et al., "Homeostatic Utility Control." IEEE Transaction on Power Apparatus and Systems, vol. PAS-99, No. 3 (May/Jun. 1980).
Brokish, Kevin Martin, "Adaptive Load Control of Microgrids with Non-Dispatchable Generation." B.S., University of Colorado (2007).

* cited by examiner

DECENTRALIZED FREQUENCY CONTROL WITH PACKET-BASED ENERGY MANAGEMENT

STATEMENT REGARDING FEDERALLY SPONSORED RESEARCH OR DEVELOPMENT

This application was supported in part by the U.S. Dept. of Energy (ARPA-E); Grant/Award #DE-AR0000694.

FIELD OF THE DISCLOSURE

The present disclosure generally relates to the field of frequency control. In particular, the present disclosure is directed to decentralized frequency control with packet-based energy coordination.

BACKGROUND

The electric power grids require a balance of electrical supply and demand. A sudden loss of supply, such as from a large generator suddenly going offline, results in a sudden drop in the powerline AC frequency and a sudden increase in supply or drop in demand will result in a sudden increase in frequency. Power grids include a number of mechanisms for responding to grid disturbance events to maintain the powerline frequency within acceptable tolerances. Frequency response mechanisms include primary frequency response, and secondary frequency response. Primary frequency response is largely automatic and instantaneous and occurs over the first few seconds following a grid disturbance event.

System inertia is a measure of the ability of the power system to oppose changes in frequency. Traditionally, system inertia has largely been provided by the mass of synchronous rotating generators and motors connected to the power grid. If system inertia is high, the frequency will fall more slowly during a grid disturbance event. Due to environmental concerns and energy policy, the integration of inverter-based renewable energy sources, such as wind and solar PV in power systems, is increasing. However, the intermittent nature of these sources has introduced new challenges. One of these is the decrease in power system inertia, reducing the power system's ability to oppose changes in frequency that results in an increase in the rate of change of frequency (ROCOF) that makes primary frequency control more challenging.

One approach to addressing decreased system inertia is to require alternative sources of damping and inertia. For example, during a sudden loss of generation, some of the stored kinetic energy in synchronous machines can be used to compensate for frequency deviations. Using spinning reserves to compensate for variability in renewable generation, however, is an expensive solution for power systems with high penetration of renewable energy sources.

Another source for primary frequency control is new control methodologies for distributed energy resources (DERs) connected to the grid. DERs equipped with frequency sensors are capable of providing fast ancillary services, such as frequency control. Primary frequency control available from DERs during the first few seconds of a disturbance event is sometimes referred to as fast frequency response (FFR). Much work has been done to find an efficient and fast method to use DERs for FFR and new primary frequency control markets for hosting frequency response reserve offers from DERs are being developed and implemented. See, e.g., W. Li, P. Du and N. Lu, "Design of a New Primary Frequency Control Market for Hosting Frequency Response Reserve Offers From Both Generators and Loads," in IEEE Transactions on Smart Grid, vol. 9, no. 5, pp. 4883-4892, September 2018, doi: 10.1109/TSG.2017.2674518.

SUMMARY OF THE DISCLOSURE

In one implementation, the present disclosure is directed to a method of providing a frequency response to an electrical grid with a distributed energy resource (DER). The method includes transitioning to an active state and drawing energy from or discharging energy to the electrical grid; maintaining a timer that indicates an amount of time since the DER transitioned to the active state or a remaining amount of time before the DER will cease drawing or discharging energy and transition from the active state to an inactive state; calculating a timer interruption threshold according to a measured frequency of the electrical grid; comparing the timer to the timer interruption threshold; and interrupting the active state in response to the timer exceeding the timer interruption threshold.

In another implementation, the present disclosure is directed to a method of providing frequency response services to an electrical grid with an aggregator in communication with a fleet of distributed energy resources (DERs), the DERs configured to operate according to a frequency response local control law that causes the DERs to interrupt the drawing or discharging of electrical energy from the electrical grid when a measured frequency of the electrical grid exceeds a frequency threshold. The method includes recording a start time when each of the DERs begin drawing or discharging energy; maintaining a timer histogram that provides a status of timer states for the fleet of DERs; and estimating a primary frequency response capability of the fleet of DERs according to the timer histogram.

Aspects of the present disclosure include a distributed energy resource controller. The distributed energy resource controller includes a processor and a non-transitory machine-readable storage medium containing machine-readable instructions configured to cause the processor to perform operations according to any of the aspects disclosed herein, including the operations recited in the first paragraph of the BACKGROUND section above. Aspects of the present disclosure also include an apparatus that includes the foregoing distributed energy resource controllers and a distributed energy resource communicatively coupled to the distributed energy resource controller. Aspects of the present disclosure also include a fleet of distributed energy resources configured to provide ancillary services, including PFR services, including FFR services, the fleet of distributed energy resources comprising a plurality of the foregoing apparatuses. Aspects of the present disclosure also include an aggregator for use in a distributed energy resource management system that is configured to aggregate a fleet of distributed energy resources. In some examples the aggregator includes a processor and a non-transitory machine-readable storage medium containing machine-readable instructions configured to cause the processor to perform operations according to any of the relevant aspects of the present disclosure, including the operations recited in the paragraph immediately above. Aspects of the present disclosure also include a system, including a fleet of distributed energy resources described in this paragraph and at least one aggregator as described in this paragraph.

BRIEF DESCRIPTION OF THE DRAWINGS

For the purpose of illustrating the disclosure, the drawings show aspects of one or more embodiments of the disclosure.

However, it should be understood that the present disclosure is not limited to the precise arrangements and instrumentalities shown in the drawings, wherein.

DETAILED DESCRIPTION

Aspects of the present disclosure include demand response methodologies for PFR, including FFR, in response to under or over frequency events. Aspects of the present disclosure also include methods for controlling a fleet of DERs equipped for FFR and quantifying in real time an amount of primary frequency control capacity available in the fleet. Such methods can be used to provide new sources of PFR control and enable participation in ancillary markets, including FFR markets.

In some examples, a fleet of DERs are designed and configured to participate in primary frequency control by configuring the DERs to switch from a conventional packetized energy management (PEM) operating mode to a frequency-responsive operating mode. The methodologies disclosed herein are capable of supporting operation on large-scale transmission systems as well as smaller microgrid systems and other types of low-inertia grids. In some examples, a methodology based on a local control policy, for example, at an individual device level, that is responsive to measured grid frequency and the device's local states, such as the device's need for energy (such as temperature or state of charge (SOC) and/or a packet timer state that indicates an extent of completion of an energy packet. A device that is drawing power may be configured to immediately stop drawing power and in some examples, begin discharging power back to the grid in response to a deviation in the measured grid frequency from a setpoint value and/or a ROCOF exceeding threshold value and according to the local control policy. In some examples, a local control policy interrupts a charging or discharging packet based on a combination of a current energy state of the device (e.g., water temperature, state of charge (SOC), etc.) and the time since it last transitioned into an energy consuming or generating state and/or the time remaining in a current active energy packet. When the local control policy is aggregated across a fleet of DERs, it dynamically prioritizes which devices will have their packets interrupted first during any frequency event on the grid. A DER can be any electrical source or load connected to the grid. Non-limiting examples of DERs include electric water heaters, smart thermostats, air conditioners, pool pumps, batteries, electric vehicle chargers, and refrigerators.

An aggregator in communication with the fleet of DERs may be configured to provide a real time estimate of an amount of primary frequency control capacity available in the fleet. For example, an aggregator may be configured to provide real-time power-frequency response capability curves for a fleet of participating DERs, including participating DERs with known transition time (e.g., those operating under packetized energy management) and/or DERs that have communicated start times when they have transitioned to an ON state and/or time since OFF. In some examples, aggregators are configured to create a power deviation vs. frequency response map that can be used by grid operators to understand how much frequency response reserves are available from the PEM fleet in real-time. As will be appreciated by persons having ordinary skill in the art, such capability can be used to improve the reliability and resilience of a grid and be used to respond to a frequency event more quickly than conventional generators. Such an aggregated DER fleet with FFR capability can also participate in ancillary services markets, including existing, upcoming, and future FFR markets.

In some examples, a packet interruption threshold mechanism is utilized that turns PEM DERs such as batteries and thermostatically controlled loads (TCLs) configured for PEM ON (charge or discharge) or OFF (standby) as a function of a measured frequency and local device information, thereby resulting in a frequency-responsive device. In some examples, devices are equipped with a packet timer that is initiated when the device is turned ON and stopped when a packet is completed. The DER devices may be configured to interrupt a packet before the packet has been completed when a threshold is exceeded, where the threshold depends on locally measured frequency, timer status, and in some examples, the device's energy state (e.g., temperature, or state of charge). In some examples, the local control policy designed for all DERs can be broadcasted and updated as needed, for example, every day/week/month/year depending on, for example, grid planning, scenarios, and predicted grid, weather, or market conditions. The control policy and the resulting threshold determine how devices are automatically prioritized during grid frequency events such as when a large generator is suddenly taken offline due to an unexpected fault.

The methods and systems disclosed herein provide the ability to deliver and accurately estimate, in real time, the aggregate power deviation of an entire fleet of DERs even when the DERs are interacting in a bottom-up decentralized fashion, meaning the individual loads react individually and independently to their local measurements as opposed to a top-down central management control scheme. As opposed to top-down broadcast-based methods of load control, the estimate can be determined online and updated in real time through an aggregator that is aware of the total number of accepted packets and/or participating devices that are ON and have communicated the time when they transitioned to ON at any time, which can be used to accurately estimate the distribution of timers and, additionally, the energy state of the fleet. Armed with this information, at each instant of time, and before any frequency disturbance, a system operator can estimate the available frequency response reserves for primary frequency control that the registered controllable loads can deliver nearly instantly, e.g., in one to two seconds, to improve grid reliability and resilience.

Aspects of the present disclosure are also disclosed in the following publication, which is incorporated by reference herein in its entirety: H. Mavalizadeh, L. A. Duffaut Espinosa and M. R. Almassalkhi, "Decentralized Frequency Control using Packet-based Energy Coordination*," 2020 IEEE International Conference on Communications, Control, and Computing Technologies for Smart Grids (SmartGridComm), Tempe, AZ, USA, 2020, pp. 1-7, doi: 10.1109/SmartGridComm47815.2020.9302972.

In a packet-based system, loads repeatedly consume energy packets of a predetermined duration and/or amount and cease consuming energy when the packet is complete even if the device still has a need for energy. For example, a water heater will temporarily stop drawing energy when a packet is complete even if the water temperature is below an upper temperature setpoint and then independently determine, according to a local control methodology, whether to make a request to an aggregator for another packet during the next communication interval. As another example, a battery may temporarily stop charging or discharging when a packet is complete even if the battery is not fully charged or discharged and then independently determine whether to make a request to an aggregator to charge or discharge another packet during the next communication epoch. In some examples, each demand-side energy consuming device is equipped with a packet timer that turns the device OFF when the timer reaches a predetermined energy packet time duration indicating the energy packet is complete. Packet-based systems can alternatively have a top-down centralized control architecture or a bottom-up decentralized control architecture. Examples of decentralized bottom-up PEM control methodologies and systems are disclosed in U.S. Pat. No. 10,256,631, titled Systems And Methods For Random-Access Power Management Using Packetization, US Patent Publication No. 2018/0082385, titled Methods And Systems For Secure Scheduling And Dispatching Synthetic Regulation Reserve From Distributed Energy Resources, and US Patent Publication No. 2019/0324415, titled Packetized Energy Management Control Systems and Methods of Using the Same, each of which are incorporated by reference herein in its entirety.

Figure 1:
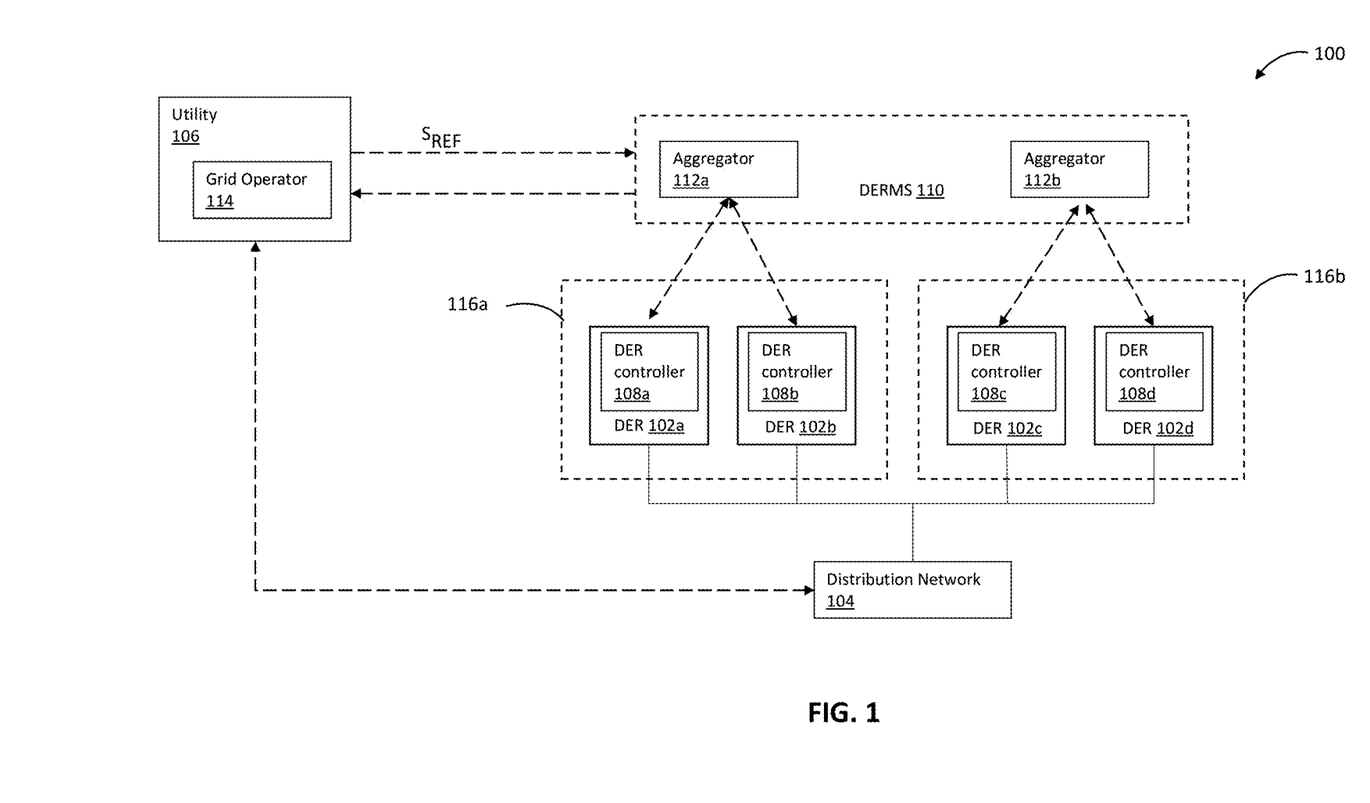
FIG. 1 is a functional block diagram of a system for the distribution and consumption of electricity that is configured with demand side packet-based distributed energy resources configured with a primary frequency response local control law and one or more aggregators configured to monitor a status of the DERs and estimate an amount of primary frequency response capability available in the fleet of DERs.

FIG. 1 illustrates an example of a system 100 for the distribution and consumption of electricity that is configured with demand side packet-based DERs 102 that are configured for fast frequency response. System 100 includes a plurality of DERs 102 that are physically connected to an electrical distribution network 104 of a utility 106. Each DER 102 is communicatively coupled to a DER controller 108 that is configured to provide PEM control functionality to the DER. The DER controllers 108 are communicatively coupled with a cloud-based DER management system (DERMS) 110 that includes one or more aggregators 112. DERMS 110 is configured to receive balancing reference signals $S_{REF}$ from, for example a grid operator 114 of utility 106 and coordinate the DERs 102 to track the balancing reference signal $S_{REF}$. DERMS 110 may be configured to communicate with utility 106 to provide real time and forecasted availability of the DERMS and DERs 102, for example with information on the availability of DERs 102, and information relating to the provision of ancillary services to the utility including primary frequency response services. Utility 106 also receives information from distribution network 104 on the state of the distribution network such as such as voltage, frequency, and power flows.

In the illustrated example, for ease of illustration, two aggregators 112 are shown, with each aggregator in communication with a corresponding group 116 of two DERs 102. In practice, system 100 can include any number of aggregators 112, any number of groups 116 and any number of DERs 102 in each group. This is particularly true for bottom-up local PEM control methodologies, which are particularly well suited for scalability to millions of DERs without a corresponding increase in communication and computation overhead cost as compared to top-down centralized control schemes. However, the FFR methodologies disclosed herein may also be applied to systems designed for centralized top-down PEM control methodologies where there is a more centralized control over the energy consumption of the DERs 102. DERs 102 may be grouped in any way, such as grouped by geographic region. For example, distribution network 104 may have any topology known in the art, such as transmission, distribution, feeder, and neighborhood levels. DERMS 110 may include a plurality of aggregators 112 for controlling the DERs connected to specific portions of the grid. Similarly, reference signals $S_{REF}$ may include reference signals for specific sections of the grid so that the aggregators 112 can separately control DERs 102 in different geographic regions so that the net energy load of the DERs located or otherwise electrically proximate each region tracks the corresponding grid reference signals for each region. In some examples, an aggregator 112 may be configured to control multiple regions of DERs 102 by comparing the requests for a specified region of DERs to a corresponding region-specific reference signal.

Figure 2:
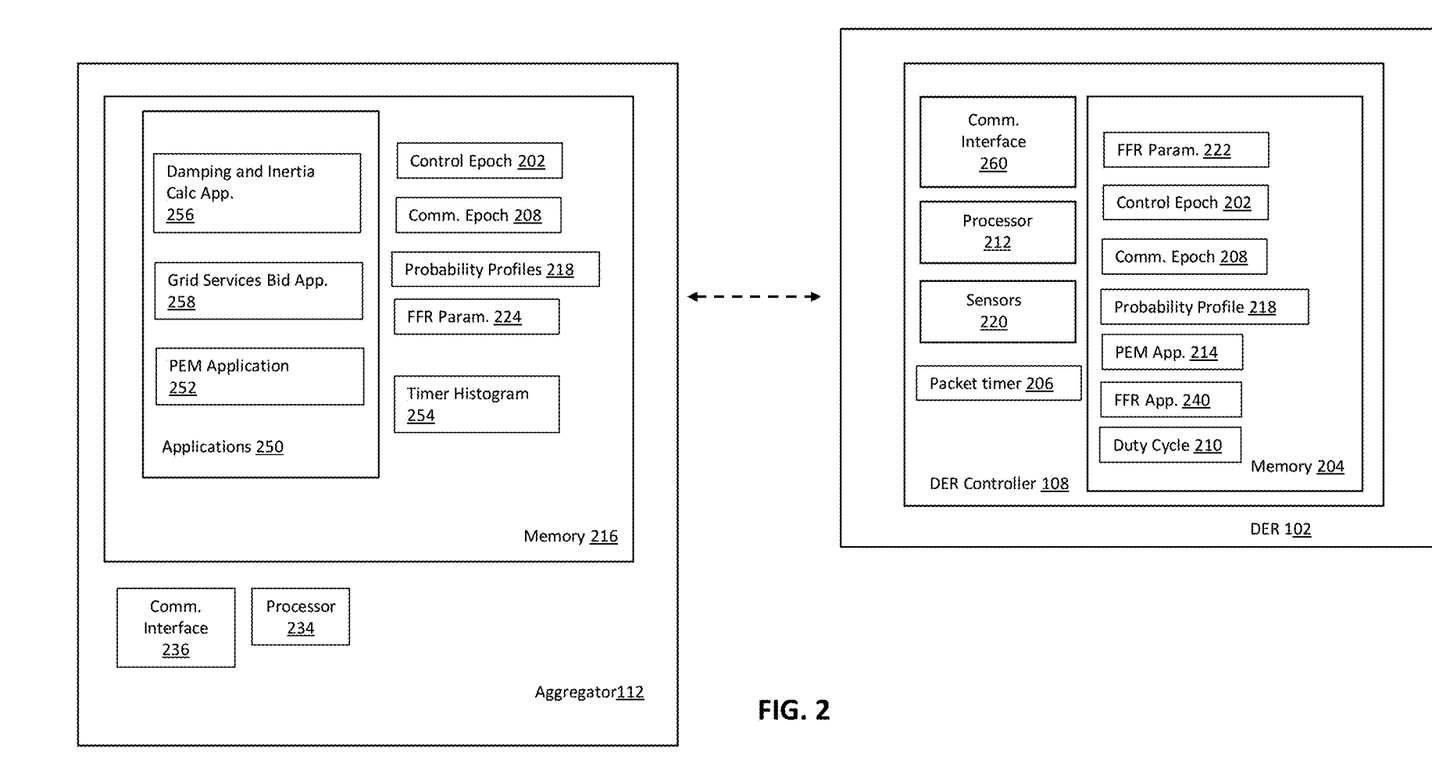
FIG. 2 is a functional block diagram of an aggregator and a DER of FIG. 1.

FIG. 2 is a functional block diagram of an example instantiation of one of aggregators 112 and one of DERs 102. DER 102 can be virtually any type or electrical device including any of the types of DERs described herein. DER controller 108 may be communicatively coupled to DER 102 in any way, such as physically coupled to a corresponding DER, physically near or adjacent a DER and in wired or wireless communication, for example, located in the same building and connected on a local network, or implemented remotely as a cloud-based software as a service for remotely managing one or more DERs 102.

DER 102 is configured to repeatedly consume and/or discharge energy in discrete quantities referred to herein as energy packets by drawing or discharging energy for a fixed period of time referred to herein as a control epoch 202, also referred to herein as the energy packet time duration, which is stored in memory 204. In one example, when a DER 102 begins to draw power, a local packet timer 206 is initiated and when the timer reaches the control epoch 202 value, DER 102 ceases drawing or discharging power. DER 102 is configured to repeatedly determine whether to draw or discharge power at regular intervals referred to herein as a communication epoch 208, also referred to herein as the communication interval. The control epoch 202 and communication epoch 208 may be the same, in which case DER 102 may immediately determine whether to request another packet after a preceding packet ends. Or the communication epoch 208 may be greater or less than the control epoch 202, and the communication epoch may vary according to whether the DER 102 previously determined to not request an energy packet or if aggregator 112 granted or denied the DER's prior request. In other examples, rather than requesting energy packets from an aggregator, DER 102 may be configured to repeatedly draw or discharge energy packets according to a duty cycle 210 that includes periods where the device is on followed by periods of time the device is off. More generally, aspects of the present disclosure may be applied to any DER in communication with an aggregator that communicates at least a start time to the aggregator when it transitions from an OFF or STANDBY state to an ACTIVE or ON state and that is configured to interrupt its active state and transition back to OFF or STANDBY in response to a timer value exceeding a calculated timer threshold due to a measured local frequency falling below a threshold value.

In some examples, one or both of the communication epoch 208 and control epoch 202 are configurable by a user of a particular DER, by aggregator 112 and/or by grid operator 114. In some examples, memory 204 includes a plurality of values for communication epoch 208 and/or control epoch 202 and a processor 212 executing instructions according to a PEM application 214 stored in memory 204 may be configured to select a particular one of the plurality of values for the communication epoch and control epoch. Aggregator 112 may similarly include a plurality of values for communication epoch 208 and control epoch 202 stored in memory 216 and be configured to send instructions to one or more DERs 102 to change one or both of the communication epoch and control epoch.

Memory 204 of DER controller 108 may also store one or more probability profiles 218 that define a probability a DER 102 will make a request to consume or discharge power during a communication epoch. DER controller 108 and/or DER 102 may also include or be communicatively coupled with one or more sensors 220 for measuring one or more locally-sensed conditions, for example, sensors 220 may include one or more of a temperature sensor, a pressure sensor, a current sensor, a frequency sensor, among others and be configured to generate a signal indicating a locally measured real time temperature, pressure, revolution rate, state of charge, power line frequency or any other condition. Any type of sensor known in the art may be used. For example, an energy metering microchip may be used, such as Microchip Technology Inc.'s energy metering microchip model number ATM90E26, or other microchips or other products with frequency measurement capability.

PEM application 214 may include instructions for selecting a probability profile 218 and determining a probability value for a given communication epoch from, for example, the selected probability profile 226 and a locally-sensed condition from one or more sensors 220. The probability value may be, for example, a probability that DER 102 will make a request to aggregator 112 to consume or discharge power during a given communication epoch. In other examples, DER 102 does not request permission from aggregator 112 and the probability value may be a probability that DER 102 will decide to consume or discharge power during a given communication epoch.

By way of non-limiting example of an implementation of such a probability value, the determined probability value may be a given value over a predetermined range, such as between zero and 1 and processor 212 may be configured to execute a random number generator that randomly generates a number between zero and 1. PEM application 214 may include instructions to request to consume or discharge energy when the random number generator value is less than the probability value and not make a request when the random number generator value is greater than the probability value. As will be appreciated by persons of ordinary skill in the art, other implementations may also be used.

DER controller 108 may also store a FFR application 240 in memory 204 that includes instructions for interrupting the DER's consumption or discharge of an energy packet before the packet timer 206 has expired when a deviation in the grid frequency measured by sensor 220 from a setpoint value and/or a ROCOF exceeds a threshold value. In one example, FFR application 240 may include instructions for interrupting an energy packet according to the following:

$$\text{Interrupt my packet?} = \begin{cases} \text{Yes} & \text{if } \eta_n[k] \geq \eta(\Delta f[k]) \\ \text{No} & \text{else} \end{cases} \quad \text{Eqn. (1)}$$

Wherein:

$$\eta_n[k] = \frac{t_n[k]}{\delta} \in [0, 1] \quad \text{Eqn. (2)}$$

$$\text{Eqn. (3)}$$

$$\eta(\Delta f) = \begin{cases} 1, & \text{if } \Delta f_{db} < \Delta f[k] \\ 1 - \left(\frac{\Delta f_{db} - \Delta f[k]}{\Delta f_{db} - \Delta f_{max}}\right)(1 - \eta_{min}), & \text{if } \Delta f_{max} \leq \Delta f[k] \leq \Delta f_{db} \\ \eta_{min}, & \text{if } \Delta f[k] \leq \Delta f_{max} \end{cases}$$

$\eta_n[k]$ is a normalized timer state;

$\eta_n(\Delta f[k])$ is a packet interruption threshold that is dependent on the locally measured AC powerline frequency measured locally frequency at time step k;

$t_n[k]$ is the value of packet timer 206 at time step k;

$\delta$ is the control epoch length or other packet length, such as the length of time a DER is drawing or discharging power according to a duty cycle 210;

$\Delta f[k]$ is the absolute value of the deviation of the real time AC powerline frequency measured locally, such as at or proximate a DER from the frequency setpoint, which is typically 60 Hz in the United States;

$\Delta f_{db}$ is the minimum deviation of the measured frequency from the target frequency (e.g., the upper part of the deadband for a frequency drop);

$\Delta f_{max}$ is a maximum deviation of the measured frequency from the target frequency (e.g., the lower part of the deadband for a frequency drop); and $\eta_{min}$ is a minimum packet timer threshold value and is less than one (1) and greater than or equal to zero (0).

The above method in Eqn. (3) can be generalized to the following:

$$\eta(\Delta f) = \begin{cases} 1, & \text{if } \Delta f_{db} < \Delta f[k] \\ 1 - g(\Delta f[k])(1 - \eta_{min}), & \text{if } \Delta f_{max} \leq \Delta f[k] \leq \Delta f_{db} \\ \eta_{min}, & \text{if } \Delta f[k] \leq \Delta f_{max} \end{cases} \quad \text{Eqn. (4)}$$

Where $g(\Delta f[k])$ is a non-increasing function of frequency deviation (e.g., drop) that maps frequency deviation (from minimum deviation $\Delta f_{db}$ to maximum deviation $\Delta f_{max}$) to timer threshold (from 1.0 to $\eta_{min}$) and is 0.0 when deviation is less than $\Delta f_{db}$ and 1.0 when deviation is more than $\Delta f_{max}$.

Clearly, the case of frequency rise (or over-frequency event) can be treated similarly by interrupting discharging (or generating) packets for DERs, which follows as above for positive (increasing) frequency deviation.

The foregoing equations 1-4 provide a dynamic packet interruption threshold, $\eta_n(\Delta f[k])$, that is a function of the locally measured frequency and is designed to be compared to the packet timer state of a single device. The result is that DERs 102 that have drawn or discharged more power because they are closer to the end of an energy packet or have otherwise been ON for a longer period of time, are interrupted first. This may be preferable to simply interrupting all DERs that are drawing or discharging power during a frequency event because, depending on the extent of participating DERs in the system, a sudden interruption of all of the DERs rather than just the ones with higher timer values could be too abrupt and cause a system instability. In addition, the controlled interruption of DERs provides exactly the mechanism to design, optimize, and quantity the MW/Hz sensitivities that define (synthetic) damping useful for FFR markets and grid operators. Additionally, prioritizing the interruption of DERs with greater packet timer values also supports quality of service because those DERs are more likely to have a lower immediate need for energy due to being at the later stage of an energy packet and/or having been on for a relatively longer period of time.

Figure 3:
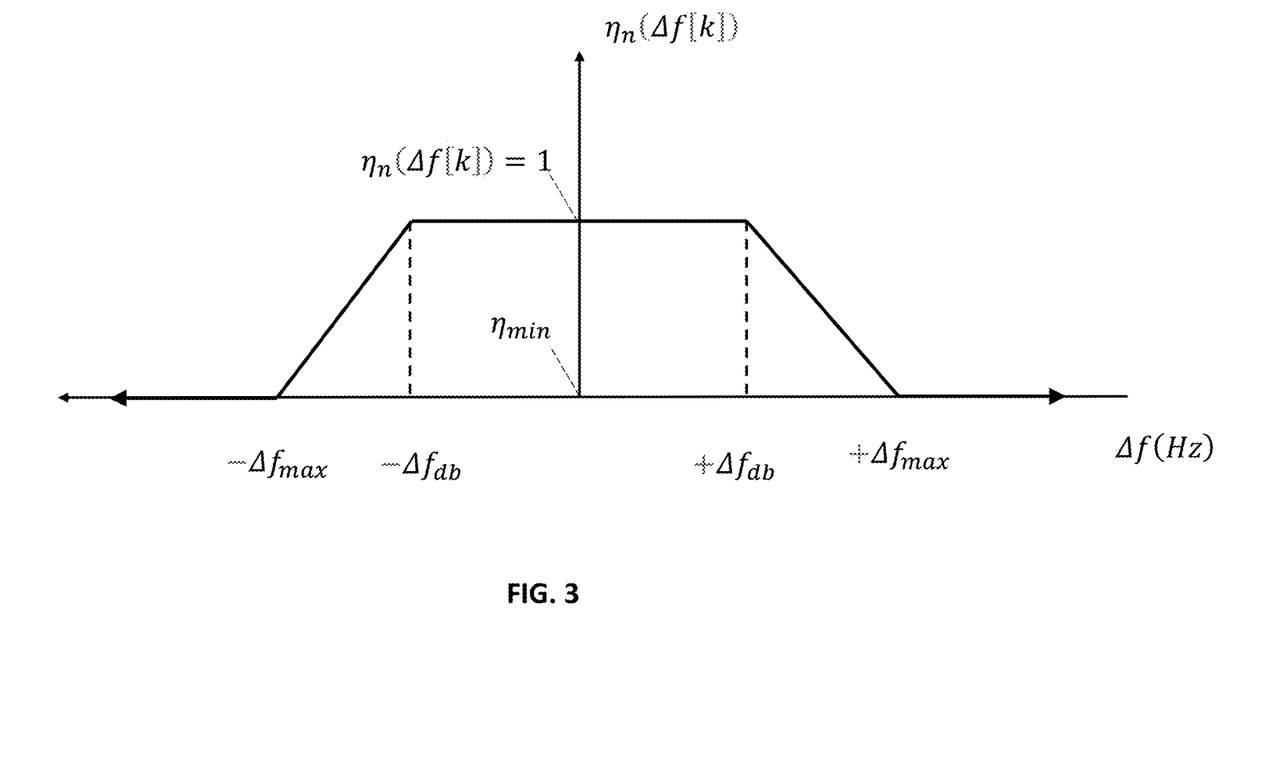
FIG. 3 illustrates a normalized packet timer interruption threshold as a function of a deviation of a locally measured frequency from a setpoint frequency.

FIG. 3 graphically illustrates Equation 3 with a deviation of a locally measured frequency from a setpoint frequency, $\Delta f$ (Hz), along the x axis and the packet timer interruption threshold, $\eta_n(\Delta f[k])$, along the y axis. FIG. 3 illustrates how the packet timer interruption threshold varies with measured frequency for both over frequency ($\Delta f>0$) and under frequency ($\Delta f<0$) events. In this example, the dead band frequency, $\Delta f_{db}$, is defined. When the measured deviation of the locally measured frequency is within the dead band frequency, no packets are interrupted. When the deviation of the measured frequency exceeds the dead band frequency, the normalized packet timer interruption threshold, $\eta_n(\Delta f[k])$, falls below 1. In the illustrated example, the packet interruption threshold is defined as a linear equation with the packet timer interruption threshold decreasing linearly with respect to increasing frequency deviation, with the packet timer interruption threshold finally reaching a minimum value when the deviation in the measured frequency from the frequency setpoint reaching the maximum frequency threshold value, $\Delta f_{max}$. In other implementations, it can be a linear or nonlinear function of either frequency deviation or the rate of change in frequency deviation or any combination of the two.

In the illustrated example, the packet timer interruption threshold, $\eta_n(\Delta f[k])$ is symmetric about the y axis, with the same frequency dead band $\Delta f_{db}$, maximum frequency deviation $\Delta f_{max}$, and slope of the threshold curve between the dead band and maximum values being the same for both under frequency and over frequency events. In other examples, each of the foregoing values may be different for under and over frequency.

In the illustrated example, the packet timer interruption threshold is a function of the deviation of the locally sensed frequency from the target frequency. In other implementations, the packet timer interruption threshold may be a function of other parameters as well, such as the DER's need for energy, and/or one or more other locally-sensed values for a particular DER that may indicate the DER's need for energy. For example, in the case of thermostatically controlled loads (TCL), the packet timer interruption threshold may be determined as a function of a deviation of a controlled temperature from a target temperature, such as a difference between a current temperature of a water heater, refrigerator, or room being heated or cooled by an HVAC system from the setpoint temperature. A battery's state of charge or other measure of the charge level of the battery may be used to determine the packet timer interruption threshold for a battery. In one example, the packets of DERs with a higher packet timer state and lower need for energy according to a locally sensed condition such as temperature or SOC may be prioritized for interruption prior to DERs with a higher need for energy that have the same packet timer state.

During an under-frequency event, DERs 102 may provide synthetic inertia from distribution networks or microgrids 104 by dynamically interrupting the energy packets of select proportions of the DERs that are drawing power from the grid in an active energy packet when the under-frequency event occurs. The DERs can be interrupted according to a local control law, such as a local control laws described herein, including interruption of packets according to timer state. For bidirectional DERs that are capable of both consuming power from the grid as well as discharging power to the grid, such as batteries, during an under-frequency event, any bidirectional DER that is drawing power and is interrupted may be controlled to immediately begin discharging power to the grid to further increase the synthetic damping provided by the DERs. Other bidirectional DERs that were not drawing power can also be controlled to immediately discharge power to the grid.

During an over-frequency event, DERs 102 may provide synthetic inertia to distribution network 104 by dynamically interrupting the energy packets of select proportions of the DERs that are discharging power to the grid in an active energy packet when the over-frequency event occurs. The DERs can be interrupted according to a local control law, such as a local control laws described herein, including interruption of packets according to timer state. For bidirectional DERs that are capable of both drawing power from the grid as well as discharging power to the grid, such as batteries, during an over frequency event, any bidirectional DER that is discharging power and is interrupted may be controlled to immediately begin drawing power to the grid to further increase the synthetic damping provided by the DERs. Other DERs, including bidirectional DERs that were not discharging power, can also be controlled to immediately begin drawing power from the grid.

For bi-directional DERs, by prioritizing for interruption the DERs in an active energy packet that have a higher timer state and are, therefore, nearing the end of the energy packet, and flipping those bi-directional DERs from drawing power to discharging power or vice versa, the DERs that will most likely provide the most damping will be interrupted and flipped first. This is because a discharging DER nearing the end of a energy packet will have recently discharged energy and therefore be more likely to be capable of drawing energy, and a charging DER nearing the end of a energy packet will have recently drawn and stored energy and therefore be more likely to be capable of discharging that recently stored energy.

Figure 4:
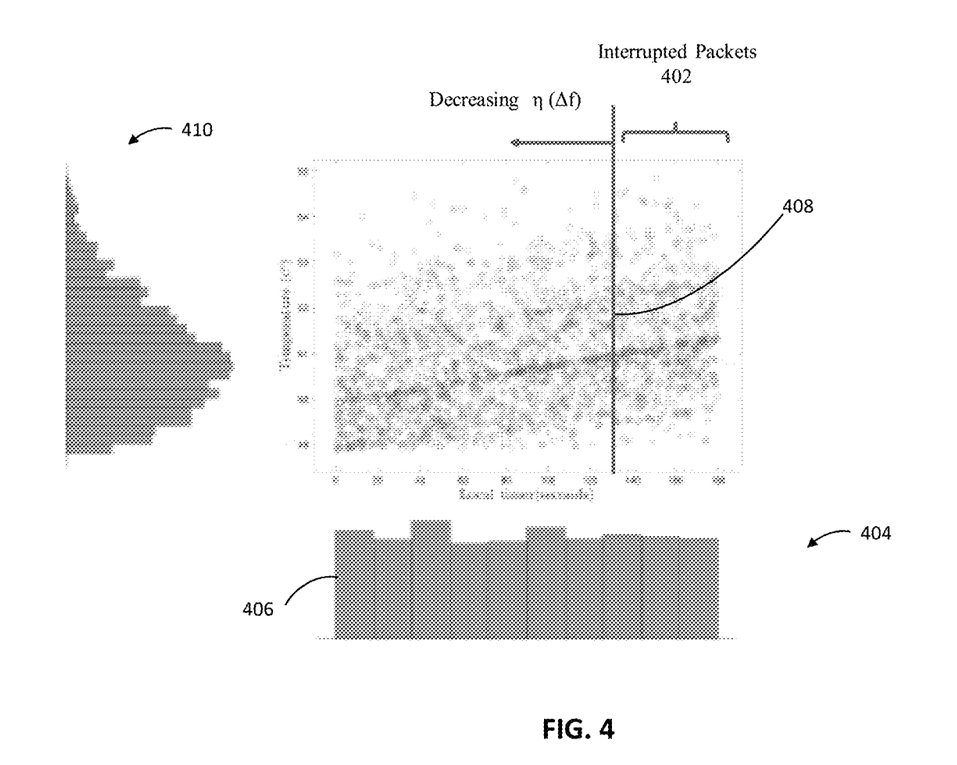
FIG. 4 illustrates an example implementation of a FFR local control law as applied to 400,000 DERs in the form of water heaters during an under-frequency event.

FIG. 4 illustrates an example implementation of a FFR local control law as applied to 400,000 DERs 102 in the form of water heaters during an under-frequency event. Packet timer values are shown along the x axis and a locally sensed condition, here the temperature of the water in the water heaters, along the y axis, with each circle on the plot representing one of the 400,000 DERs. In this example, the control epoch (time duration of an energy packet) is three minutes. As would be expected, there is a general upward trend in water temperature as the value of the packet timer increases because the water heaters with a higher packet timer have been drawing energy to heat water for a longer period of time. At the point in time shown in FIG. 4, the frequency has dropped below the dead band frequency such that the timer interruption threshold 408 is less than the energy packet length, resulting in all DERs with a packet timer value greater than timer threshold 408 being interrupted (interrupted packets 402). If the measured frequency continues to fall, the timer interruption threshold 408 will move to the left and decrease resulting in a greater proportion of water heaters being interrupted.

Referring again to FIG. 2, memory 204 of DER controller 108 may be configured to also store FFR parameters 242 in memory, which may include any of the FFR parameters disclosed herein including $\Delta f_{db}$, $\Delta f_{max}$ and $\eta_{min}$, among others. The foregoing parameters may be the same for both under-frequency and over-frequency or the memory may include one or more separate FFR parameters for over and under frequency events.

Memory 216 of aggregator 112 may include one or more software applications 250 including a PEM application 252 that includes instructions for controlling DERs 102 according to a PEM control scheme including any of the PEM control schemes disclosed herein. In embodiments where DERs 102 make a request to aggregator 112 to consume or discharge a energy packet, PEM application 252 may include instructions for approving or denying the request and also include instructions for tracking the accepted requests in memory 216.

With the limited information of (1) the FFR local control law the DERs 102 are configured to execute, (2) the number of DER energy packets that begin at each time step, and (3) the time duration of the packets (also referred to herein in some examples as the control epoch), aggregator 112 can utilize damping and inertia calculation application 256 to calculate a real time estimate of the available synthetic damping (MW/s) and/or inertia (MW/s^2) that is available from the fleet of DERs. Aggregator 112 may also be configured to provide real-time power-Frequency frequency-response capability curves for the fleet of PEM-enabled DERs and create a power deviation vs. frequency response map that can be used by grid operator 114 to understand how much frequency response reserves are available from the DER fleet. Aggregator 112 may also include a grid services bid application 258 which can include instructions for using the calculation of damping and inertia of the fleet in an optimization calculation to determine how much to bid day-ahead for primary frequency response services, which could also include consideration of expected participation in other grid services.

In one example, aggregator 112 is configured to maintain a timer histogram 254 in memory 216 that maintains a record of a number of DERs that are consuming or discharging a energy packet at any given time and the normalized packet timer state of each active DER. In one example, the normalized packet timer state is the packet timer value divided by the time duration of the energy packet. By tracking a normalized value, DERs 102 configured to operate with different-length energy packets can be considered together as a group. Referring again to FIG. 4, FIG. 4 includes a conceptual graphical representation 404 of packet timer histogram 254. In the illustrated example, aggregator 112 may be configured to break up a normalized control epoch into a plurality of bins 406 (only one labeled) and track the number of DERs 102 in each bin. With knowledge of the FFR local control law the DERs are configured to execute, including the packet timer interruption threshold value calculated by each DER, aggregator 112 can predict the number of active DERs that would automatically, independently, and instantaneously interrupt an active energy packet at any given point in time in response to a local power line frequency measurement. FIG. 4 also illustrates a temperature histogram 410 that maintains a status of temperatures of the fleet of water heaters. In some examples, the water heaters may be configured to communicate a water temperature to an aggregator while in others the aggregator may include instructions for calculating an estimate of the temperature histogram according to knowledge of the fleet of DERs and history of accepted or denied energy packets. Aggregator 112 may similarly be configured to maintain a SOC histogram as well as or alternatively a real time energy capacity distribution that quantifies a level of energy stored in by the fleet of DERs at any given point in time.

Aggregator 112 may be configured to track a packet timer status of DERs operating under a variety of different PEM control schemes. In some examples, one or more DERs 102 may be configured to independently determine when to consume power without requesting permission from aggregator 112. Such DERs can send a notification to aggregator 112 indicating when it began a new energy packet and the time duration of the energy packet, which the aggregator can use to maintain the timer histogram 254. The foregoing may include DERs configured to draw power according to a duty cycle, where the period of time in the duty cycle the DER is ON is considered a energy packet. In yet other examples, DERs that are not operating according to a PEM control scheme or a regular duty cycle may have a minimum ON time duration that may be used in place of a control epoch. In such cases, an aggregator may be configured with a default minimum ON time, which may be defined for a particular category of DER (such as air conditioner, water heater, battery charger, etc.) or the minimum ON time may be communicated from the DER to the aggregator. The DER may use the minimum on time to calculate a timer interruption threshold value. The DER 102 may be equipped with communication capability for transmitting a status signal to the aggregator for tracking a damping and inertia of the fleet.

Referring again to FIG. 2, damping and inertia calculation application 256 may include instructions for calculating a real time estimate of an equivalent damping and inertia available from the fleet of DERs 102 according to the timer histogram 254. In one example, the damping and inertia calculation application 256 includes instructions for performing a calculation according to the following:

$$\Rightarrow D_{PEM} = P^{rate} \frac{\eta_{max} n_p \bar{x}_{nom}}{\Delta f_{db} - \Delta f_{max}} \qquad \text{Eqn. (5)}$$

Wherein:
$D_{PEM}$ is the damping coefficient (e.g., MW/mHz) for the fleet and describes the sensitivity of the fleet's packet interruption rate (change in power) as a function of change in frequency,
$P_{rate}$ is power rating (kW) of each device and given by Aggregator,
$n_p$ is total number of timer bins based on resolution of sensors and desired response characteristics,
$x_{nom}$ is the average number of DERs that are ON in each bin.

Eqn. (5) provides a highly accurate estimate of the fleet's ability to respond to changes in frequency (MW/mHz) when the distribution of timers across the fleet is approximately uniform. If the fleet is participating in other grid services or the Aggregator(s) have otherwise been varying the control of the fleet an alternate formulation described in equations 6-8 described below may be used. When the fleet is in a stationary state where the distribution of timers is approximately uniform, the rate of response (change in MW vs. change in frequency) is constant, which explains why $D_{PEM}$ in Equation 5 is constant.

In the case where DERs are actively participating in other grid services (e.g., ancillary services or load shaping) and not in a stationary state, Eqn. (5) can be generalized to provide grid operators or a DER aggregator a real-time, power-frequency response map:

$$P_{PEM}(\Delta f[k]) = \sum_{b=0}^{\beta(\Delta f[k])-1} t_{B-b}[k] P_{B-b}^{rate}[k] \quad \text{Eqn. (6)}$$

Wherein:
$P_{PEM}$ is the cumulative power reduction at time k achieved by the fleet for a given change in frequency $\Delta f[k]$ between $\Delta f_{max}$ and $\Delta f_{db}$, and is 0 above $\Delta f_{db}$, where
$t_{B-b}[k]$ is the number of packets in coordinator's timer distribution bin B-b at time k, where $B=\delta/\Delta t$ is the total number of bins (and largest bin index corresponding with normalized timer states with value 1.0) in the coordinator's timer distribution and $\delta$ is the packet duration (seconds) and $\Delta t$ is the timer distribution's bin width (seconds),
$P^{rate}_{B-b}[k]$ is the average height (power rating in kW) of charging packets in the coordinator's timer distribution bin B-b at time k, and
$B-(\beta(\Delta f[k])-1)$ is the smallest (last) bin in the timer interrupted by frequency drop (at nadir) and $\beta(\Delta f[k])$ is defined by the timer threshold and designates the bin to interrupt and is computed by the coordinator with the following:

$$\beta(\Delta f[k]) = \frac{\delta}{\Delta t} \eta(\Delta f[k]) \quad \text{Eqn. (7)}$$

Wherein:
$\beta(\Delta f[k])$ in Eqn (6) represents the bin number corresponding to the computed timer threshold. Rounding techniques may be used, if necessary, to match $\beta$ with specific bin.

If the frequency exceeds $\Delta f_{max}$ the power drop of the fleet saturates with the timer threshold at $$P_{PEM}(\Delta f[k]) = \sum_{b=0}^{\beta(\Delta f_{max})-1} t_{B-b}[k] P_{B-b}^{rate}[k]. \quad \text{Eqn. (8)}$$

Figure 5A:
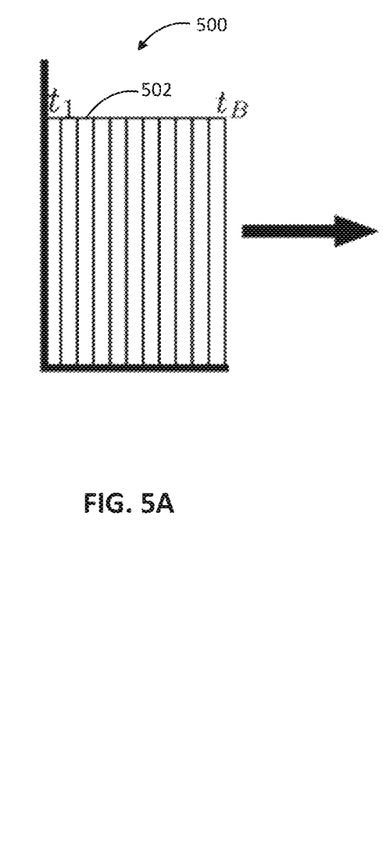
FIG. 5A is a timer histogram for a fleet of DERs operating at steady state.
Figure 5B:
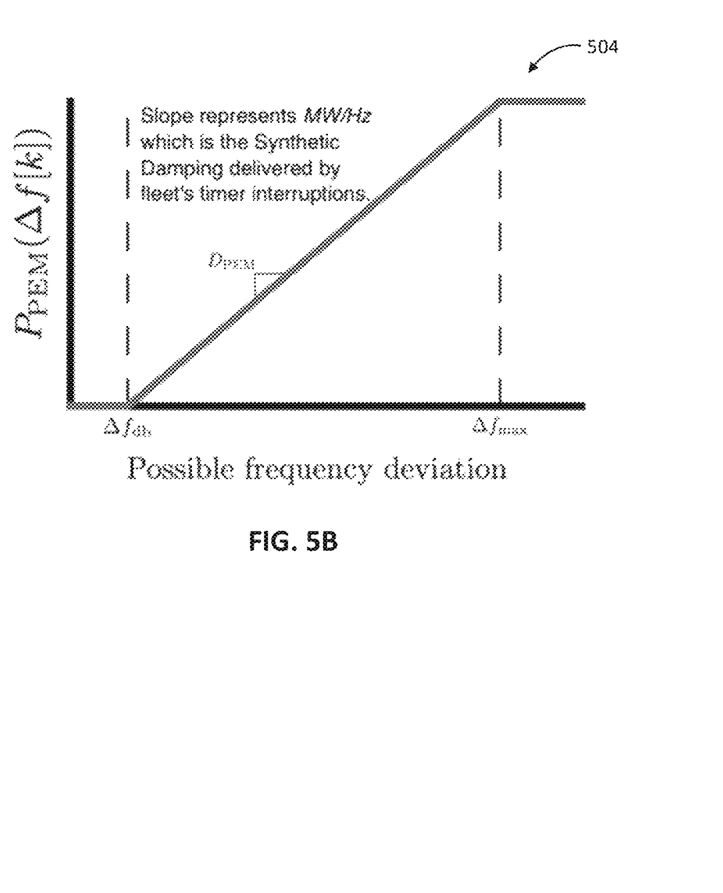
FIG. 5B is a corresponding power deviation vs. frequency response map for the timer histogram shown in FIG. 5A.
Figure 6A:
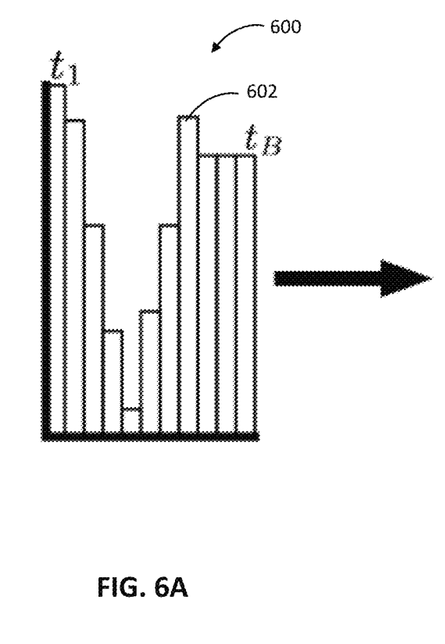
FIG. 6A is a timer histogram for a fleet of DERs that have not been operating at steady state.
Figure 6B:
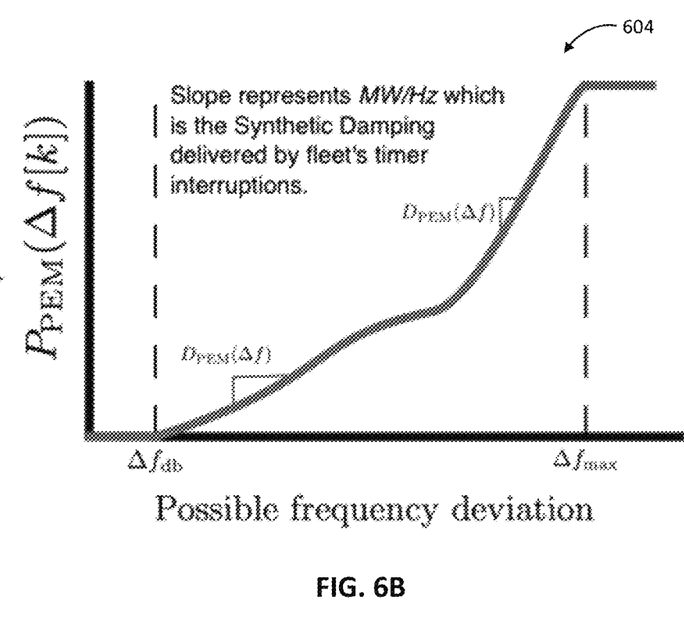
FIG. 6B is a corresponding power deviation vs. frequency response map for the timer histogram shown in FIG. 6A.

FIGS. 5A-6B conceptually illustrate a timer distribution and corresponding power deviation vs. frequency response map and associated damping coefficient for a fleet with a uniform timer distribution (FIGS. 5A, 5B) and for a fleet with a non-uniform timer distribution (FIGS. 6A, 6B). FIG. 5A shows a uniform timer distribution 500 which can be expected when a fleet of DERs is operating in steady state and following a steady control signal from an aggregator. The X axis of timer distribution 500 is a normalized control epoch divided into a plurality of bins 502 (only one labeled) and the y axis represents a height of each bin which represents a number of participating DERs having a timer value that falls within a corresponding bin. The choice of bin width is a design variable chosen by the aggregator and affects quantization of the estimate. It should not be chosen too large as that causes the Power-frequency curve 504 to become jagged. In some example applications, a bin width is about 5-10 second may be appropriate, with the optimum bin width depending on the size of fleet. For example, large fleets can employ smaller bin widths as more devices are participating and thus populating the timer bins 502.

FIG. 5B is a power deviation vs. frequency response map 504 that illustrates a change in power (y axis) than can be expected from interrupting participating DERs as a function of a potential or expected deviation of frequency (x axis), with the slope of the curve equal to the damping. An aggregator, such as one of aggregators 112 or another computing device configured to perform a calculation with equation 5, may be used to generate a real time power deviation vs. frequency response map and synthetic damping illustrated in FIG. 5B.

FIG. 6A conceptually illustrates an example of a non-uniform timer distribution 600 which can be expected when a fleet of DERs has not been operating in steady state and has been following a varying control signal from an aggregator, which may occur when the fleet of DERs are being used to provide additional ancillary services and/or after a grid disturbance event. The X axis of timer distribution 600 is a normalized control epoch divided into a plurality of bins 602 (only one labeled) and the y axis represents a number of participating DERs having a timer value that falls within a corresponding bin. FIG. 6B is a power deviation vs. frequency response map 604 that illustrates a change in power (y axis) than can be expected from interrupting participating DERs as a function of a potential or expected deviation of frequency (x axis), with the slope of the curve equal to the damping. An aggregator, such as one of aggregators 112 or another computing device configured to perform a calculation with equations 6-8 may be used to generate a real time power deviation vs. frequency response map and synthetic damping illustrated in FIG. 6B. As conceptually illustrated in FIGS. 6A and 6B, the power deviation vs. frequency response map 604 can be expected to be non-linear and the resulting damping can be variable as a function of frequency deviation when the distribution of the fleet is non-uniform.

In some examples, aggregator 112 may be configured to broadcast updated values for the FFR parameters 242 to the fleet of DERs 102 at any time and in response to any of a variety of conditions. In one example, aggregator 112 may be configured to update one or more FFR parameter 242 according to a number of DERs that are active and the proportion of the total load of the DERs on the distribution network in order to optimize grid stability and availability of damping and inertia. For example, the minimum packet timer value, $\eta_{min}$, the frequency dead band, $\Delta f_{db}$, and/or the slope of the curve of the packet interruption threshold, $\eta_n(\Delta f[k])$, may be adjusted.

Example System Architectures

System 100 may have any of a variety of architectures including various combinations of hardware and software to provide the various functionalities described herein. For example, processor 234 of each aggregator 112, and processor 212 of each DER controller 108 may include any type of one or more processing units known in the art, including one or more data processors, image processors and/or central processing units, and can be separate components, or can be integrated in one or more integrated circuits, and can be coupled by one or more communication buses or signal lines. Memory 216 of aggregators 112 and memory 204 of DER controller 108 may similarly be of any of a variety of types and configuration and may be a non-transitory machine-readable storage media. Memory of various components in system 100, such as memory 216 or 204, may include high-speed random access memory and/or non-volatile memory, such as DRAM, SRAM, EDO RAM, one or more magnetic disk storage devices, one or more optical storage devices, and/or flash memory. Memory 216 and memory 204 can store a number of other applications and instructions in addition to those illustrated and described, such as operating system instructions and instructions for operating any hardware and peripherals operably coupled to the corresponding memory and computing device.

Various components of system 100 may be configured to exchange data and information via any means known in the art, including communication between aggregator 112 and other components of the system via communication interface 236 and communication between each DER 102 and other components of the system via communication interface 260. Communication interfaces 236 and 260 may include wireless communication components, which can include antennas, radio frequency receivers and transmitters and/or optical (e.g., infrared) receivers and transmitters. The specific design and implementation can depend on the communication network(s) over which the particular computing device, e.g. particular aggregator 112 or DER 102 is intended to operate. By way of example, communication interfaces can include communication components designed to operate over a GSM network, a GPRS network, an EDGE network, a Wi-Fi or WiMax network, and a Bluetooth™ network.

Communication interfaces of system 100, such as communication interfaces 236 and 260, may include one or more network devices configured to communicate with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, or controller area network (CAN). Communication interfaces may also include a built-in network adapter, network interface card, PCMCIA network card, card bus network adapter, wireless network adapter, USB network adapter, modem or any other device suitable for interfacing a computing device of system 100 to any type of network capable of communication and performing the operations described herein. And the components of system 100 may be communicatively coupled by any means known in the art, e.g., local and/or remote communication utilizing any of a wide range of wired and/or wireless communications protocols, including, for example, a digital multiplexer (DMX) interface protocol; a Wi-Fi protocol; a Bluetooth protocol; a digital addressable lighting interface (DALI) protocol; a ZigBee protocol; a near field communication (NFC) protocol; a local area network (LAN)-based communication protocol; a cellular-based communication protocol; an Internet-based communication protocol; a satellite-based communication protocol; and/or a combination of any one or more thereof.

Aggregator 112 and DER controller 108 may be implemented in any type of computer system, such as a workstation, desktop computer, server, laptop, handheld computer, tablet computer, mobile computing device, server, one or more virtual machines, or other form of computing or telecommunications device that is capable of communication, has sufficient processor power and memory capacity to perform the operations described herein.

Example Methods of Operation

Figure 7:
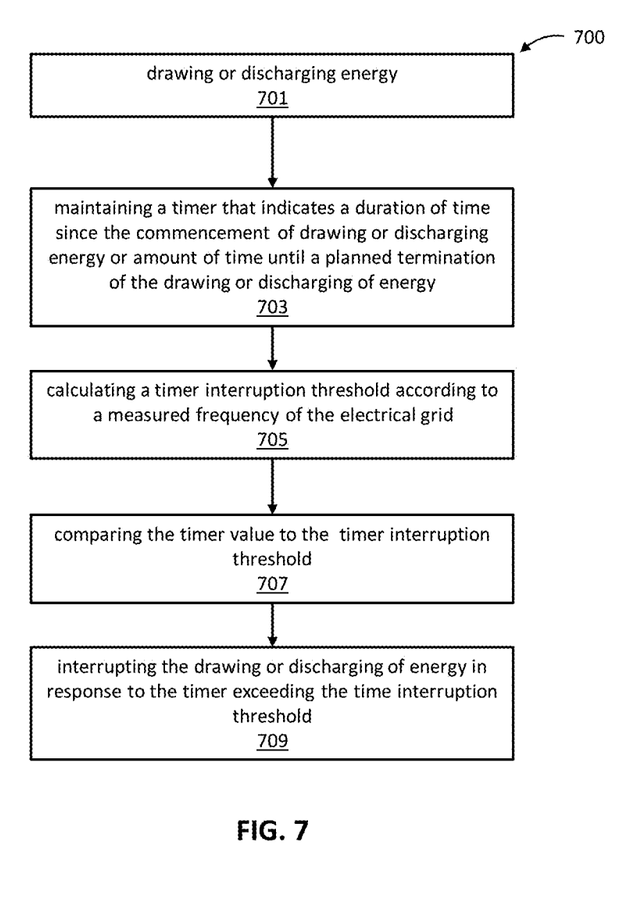
FIG. 7 illustrates an example method of providing a frequency response to an electrical grid with a DER.

FIG. 7 illustrates an example method 700 of providing a frequency response to an electrical grid with a DER, such as one of DERs 102, and may include, at block 701, drawing or discharging energy packets, for example, according to any of the packetized energy control schemes described herein, and at block 703, maintaining a timer that indicates a duration of time since the commencement of drawing or discharging energy or amount of time until a planned termination of the drawing or discharging of energy. In some examples, block 703 includes maintaining a packet timer that indicates a remaining amount of time before the completion of an energy packet. At block 705, the method may include calculating a timer interruption threshold according to a measured frequency of the electrical grid. In one example, block 705 may include execution of FFR application 240 including performing calculations according to Equations 1-3 above. At block 707, the method may include comparing the timer value to the calculated timer interruption threshold, and at block 709, interrupting the drawing or discharging of energy in response to the timer exceeding the calculated timer interruption threshold. For example, a locally measured AC frequency of the electrical supply adjacent a DER may deviate from a frequency set point, e.g., 60 Hz, by an amount greater than a frequency dead band value, resulting in a decrease in the calculated timer interruption threshold such that the timer value suddenly exceeds the calculated timer interruption threshold. DER 102 may then independently and immediately interrupt the drawing or discharging of energy as part of a FFR local control policy.

Figure 8:
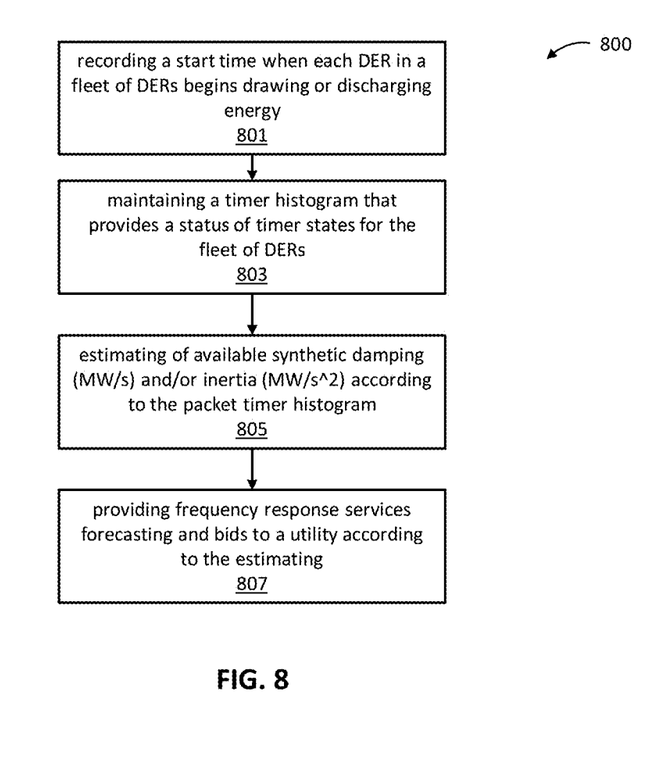
FIG. 8 illustrates an example method of providing frequency response services to an electrical grid with an aggregator.

FIG. 8 illustrates an example method 800 of providing frequency response services to an electrical grid with an aggregator, such as aggregator 112 in communication with a plurality of DERs, such as a plurality of DERs 102. At block 801, the method may include recording a start time when each DER begins to draw or discharge electrical energy from or to the electrical grid and at block 803, maintaining a timer histogram, such as energy packet timer histogram 254, that provides a status of timer states for the fleet of DERs. At block 805, the method may include estimating an available synthetic damping (MW/s) and/or inertia (MW/s^2) according to the timer histogram. In one example, block 805 may include execution of damping and inertia calculation application 256, including performing calculations according to Equations 5-8 above. And at block 807, providing frequency response services forecasting and bids to a utility according to the estimating.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

What is claimed is:

1. A method of providing a frequency response to an electrical grid with a distributed energy resource (DER), the method comprising:
    transitioning to an active state and drawing energy from or discharging energy to the electrical grid;
    maintaining a timer that indicates an amount of time since the DER transitioned to the active state or a remaining amount of time before the DER will cease drawing or discharging energy and transition from the active state to an inactive state;
    calculating a timer interruption threshold according to a measured frequency of the electrical grid;
    comparing the timer to the timer interruption threshold; and
    interrupting the active state in response to the timer exceeding the timer interruption threshold.

2. The method of claim 1, wherein the step of drawing or discharging energy includes drawing energy from the electrical grid and the step of interrupting an energy packet includes reducing or eliminating the drawing of energy.

3. The method of claim 2, further comprising, after the interrupting step, immediately discharging energy to the electrical grid.

4. The method of claim 1, wherein the step of drawing or discharging energy includes discharging energy to the electrical grid and the step of interrupting includes reducing or eliminating the discharging of energy.

5. The method of claim 4, further comprising, after the interrupting step, immediately drawing energy from the electrical grid.

6. The method of claim 1, wherein the timer interruption threshold varies as a function of the measured frequency.

7. The method of claim 1, wherein the timer interruption threshold varies as a function of the measured frequency and a locally sensed value that indicates the DER's need for energy.

8. The method of claim 7, wherein the locally sensed value is at least one of a state of charge of the DER and a temperature of a temperature-controlled space controlled by the DER.

9. The method of claim 1, wherein the step of calculating includes:
    calculating a frequency deviation, $\Delta f$, wherein $\Delta f$ is an absolute value of a deviation of the magnitude or rate of change of the measured frequency from a frequency setpoint; and
    comparing $\Delta f$ to a frequency threshold parameter.

10. The method of claim 9, wherein the frequency threshold parameter includes a frequency dead band and a maximum frequency deviation.

11. The method of claim 10, wherein the timer interruption threshold decreases when $\Delta f$ exceeds the frequency dead band and is a constant value when $\Delta f$ is equal to or greater than the maximum frequency deviation.

12. The method of claim 1, wherein the measured frequency is a frequency measurement of electrical power on the electrical grid obtained from a frequency sensor proximate the DER.

13. The method of claim 1, further comprising communicating with an aggregator when transitioning to the active state for grid frequency response monitoring and forecasting by the aggregator.

14. The method of claim 1, wherein the step of transitioning to an active state includes drawing energy from or discharging energy to the electrical grid in discrete energy packets drawn or discharged during a predetermined energy packet time duration, wherein the timer indicates an amount of time since the energy packet began or a remaining amount of time before the completion of an energy packet.

15. The method of claim 14, wherein the step of drawing or discharging energy includes:
    determining, at predetermined communication intervals, whether to make a request to draw or discharge an energy packet; and
    making a request to an aggregator to draw or discharge an energy packet in response to determining to make a request.

16. The method of claim 15, wherein the determining step includes stochastically determining to make a request according to a probability calculation.

17. The method of claim 1, wherein the step of transitioning to an active state includes drawing or discharging energy according to a duty cycle that includes on and off periods, wherein the timer indicates an amount of time since the DER transitioned to an active state or a remaining amount of time before the completion of an on period of the duty cycle.

* * * * *